United States Patent
Xiao

(10) Patent No.: US 8,780,505 B1
(45) Date of Patent: Jul. 15, 2014

(54) METHOD AND SYSTEM FOR PROVIDING A READ TRANSDUCER HAVING AN IMPROVED COMPOSITE MAGNETIC SHIELD

(71) Applicant: Western Digital (Fremont), LLC, Fremont, CA (US)

(72) Inventor: Rongfu Xiao, Dublin, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/795,333

(22) Filed: Mar. 12, 2013

(51) Int. Cl.
*G11B 5/39* (2006.01)

(52) U.S. Cl.
USPC .......................................................... 360/319

(58) Field of Classification Search
USPC .......... 360/319, 324.1, 324.11, 324.12, 324.2
See application file for complete search history.

(56) References Cited

U.S. PATENT DOCUMENTS

| | | | |
|---|---|---|---|
| 5,621,592 A | 4/1997 | Gill et al. | |
| 5,750,275 A | 5/1998 | Katz et al. | |
| 5,804,250 A | 9/1998 | Yang | |
| 5,838,521 A | 11/1998 | Ravipati | |
| 6,033,491 A | 3/2000 | Lin | |
| 6,087,027 A | 7/2000 | Hoshiya et al. | |
| 6,129,957 A | 10/2000 | Xiao et al. | |
| 6,233,116 B1 | 5/2001 | Chen et al. | |
| 6,259,583 B1 | 7/2001 | Fontana, Jr. et al. | |
| 6,292,334 B1 * | 9/2001 | Koike et al. | 360/319 |
| 6,315,839 B1 | 11/2001 | Pinarbasi et al. | |
| 6,322,640 B1 | 11/2001 | Xiao et al. | |
| 6,358,635 B1 * | 3/2002 | Min et al. | 428/800 |
| 6,373,667 B1 | 4/2002 | Han et al. | |
| 6,413,325 B1 | 7/2002 | Shimazawa et al. | |
| 6,430,015 B2 | 8/2002 | Ju et al. | |
| 6,437,949 B1 | 8/2002 | Macken et al. | |
| 6,452,385 B1 | 9/2002 | Shimazawa et al. | |
| 6,456,467 B1 | 9/2002 | Mao et al. | |
| 6,478,884 B2 | 11/2002 | Shimazawa et al. | |
| 6,482,657 B2 | 11/2002 | Shimazawa | |
| 6,496,335 B2 | 12/2002 | Gill | |
| 6,628,478 B2 | 9/2003 | Gill | |
| 6,724,581 B2 | 4/2004 | Westwood | |
| 6,754,048 B2 | 6/2004 | Li et al. | |
| 6,778,358 B1 | 8/2004 | Jiang et al. | |
| 6,791,796 B2 | 9/2004 | Shukh et al. | |
| 6,801,409 B2 | 10/2004 | Michel et al. | |
| 6,818,330 B2 | 11/2004 | Shukh et al. | |
| 6,848,169 B2 | 2/2005 | Shin et al. | |

(Continued)

FOREIGN PATENT DOCUMENTS

JP    20022998314 A    10/2002

*Primary Examiner* — Jefferson Evans

(57) ABSTRACT

A method and system provide a magnetic transducer including a first shield, a read sensor, and a second shield. The read sensor is between the first shield and the second shield. The second shield includes a first ferromagnetic layer, a nonmagnetic spacer layer, a second ferromagnetic layer and a pinning layer. The nonmagnetic spacer layer is between the first ferromagnetic layer and the second ferromagnetic layer. The first ferromagnetic layer is between the read sensor and the nonmagnetic spacer layer. The pinning layer is adjacent to the second ferromagnetic layer. The first ferromagnetic layer is coupled antiparallel with the second ferromagnetic layer. At least one of the first ferromagnetic layer and the second ferromagnetic layer includes a CoFe portion adjacent to the nonmagnetic spacer layer. The CoFe portion includes at least twenty-five atomic percent and not more than fifty atomic percent Fe.

23 Claims, 6 Drawing Sheets

(56) References Cited

U.S. PATENT DOCUMENTS

| | | |
|---|---|---|
| 6,876,507 B2 | 4/2005 | Chen et al. |
| 6,927,952 B2 | 8/2005 | Shimizu et al. |
| 6,967,823 B2 | 11/2005 | Nakamoto et al. |
| 6,980,403 B2 | 12/2005 | Hasegawa |
| 6,998,061 B1 | 2/2006 | Cross |
| 7,029,771 B2 | 4/2006 | Hasegawa et al. |
| 7,046,487 B2 | 5/2006 | Terunuma |
| 7,057,853 B2 | 6/2006 | Okada et al. |
| 7,158,351 B2 | 1/2007 | Nakamoto et al. |
| 7,166,173 B2 | 1/2007 | Beach |
| 7,170,723 B2 | 1/2007 | Taguchi |
| 7,180,712 B1 * | 2/2007 | Li et al. ............... 360/319 |
| 7,270,896 B2 | 9/2007 | Parkin |
| 7,295,401 B2 | 11/2007 | Jayasekara et al. |
| 7,324,309 B1 | 1/2008 | Wiesen et al. |
| 7,342,751 B2 | 3/2008 | Nagasaka et al. |
| 7,382,574 B2 | 6/2008 | Li et al. |
| 7,426,091 B2 | 9/2008 | Okada et al. |
| 7,443,639 B2 | 10/2008 | Parkin |
| 7,446,979 B2 | 11/2008 | Jayasekara |
| 7,457,080 B2 | 11/2008 | Watabe et al. |
| 7,551,394 B2 | 6/2009 | Sasaki et al. |
| 7,554,765 B2 | 6/2009 | Shukh et al. |
| 7,599,154 B2 | 10/2009 | Sbiaa et al. |
| 7,606,007 B2 * | 10/2009 | Gill ............... 360/319 |
| 7,606,010 B2 | 10/2009 | Parkin |
| 7,652,854 B2 | 1/2010 | Kagami et al. |
| 7,666,467 B2 | 2/2010 | Parkin |
| 7,773,341 B2 | 8/2010 | Zhang et al. |
| 7,807,218 B2 | 10/2010 | Parkin |
| 7,859,797 B2 | 12/2010 | Hoshino et al. |
| 7,906,231 B2 | 3/2011 | Parkin |
| 7,911,737 B1 | 3/2011 | Jiang et al. |
| 8,049,997 B2 | 11/2011 | Miyauchi et al. |
| 8,089,734 B2 | 1/2012 | Miyauchi et al. |
| 8,125,743 B2 | 2/2012 | Ohta et al. |
| 8,402,635 B2 | 3/2013 | Degawa et al. |
| 8,441,756 B1 | 5/2013 | Sun et al. |
| 8,451,567 B2 | 5/2013 | Zhou et al. |
| 8,472,147 B2 | 6/2013 | Singleton et al. |
| 8,531,801 B1 * | 9/2013 | Xiao et al. ............... 360/319 |
| 8,630,069 B1 * | 1/2014 | Okawa et al. ............... 360/319 |
| 2001/0043446 A1 | 11/2001 | Barlow et al. |
| 2002/0064002 A1 * | 5/2002 | Gill ............... 360/319 |
| 2002/0149886 A1 | 10/2002 | Gill |
| 2004/0120074 A1 | 6/2004 | Okada et al. |
| 2004/0196681 A1 | 10/2004 | Xiao et al. |
| 2005/0013044 A1 | 1/2005 | Hirata et al. |
| 2005/0264948 A1 | 12/2005 | Nakamoto et al. |
| 2006/0003185 A1 | 1/2006 | Parkin |
| 2006/0044682 A1 | 3/2006 | Le et al. |
| 2006/0109592 A1 | 5/2006 | Watanabe et al. |
| 2006/0119981 A1 | 6/2006 | Li et al. |
| 2007/0019341 A1 | 1/2007 | Mizuno et al. |
| 2007/0053114 A1 | 3/2007 | Uesugi et al. |
| 2007/0111332 A1 | 5/2007 | Zhao et al. |
| 2007/0195467 A1 | 8/2007 | Gill |
| 2008/0013221 A1 | 1/2008 | Ohta et al. |
| 2008/0179699 A1 | 7/2008 | Horng et al. |
| 2009/0027810 A1 | 1/2009 | Horng et al. |
| 2009/0052092 A1 | 2/2009 | Zhou et al. |
| 2009/0128944 A1 | 5/2009 | Jang et al. |
| 2009/0168240 A1 | 7/2009 | Hsiao et al. |
| 2009/0174971 A1 | 7/2009 | Tsuchiya et al. |
| 2009/0279213 A1 | 11/2009 | Wu et al. |
| 2010/0039734 A1 * | 2/2010 | Hara et al. ............... 360/319 |
| 2010/0079917 A1 | 4/2010 | Miyauchi et al. |
| 2010/0149689 A1 | 6/2010 | Tsuchiya et al. |
| 2010/0320076 A1 | 12/2010 | Zhao et al. |
| 2011/0097601 A1 | 4/2011 | Bai et al. |
| 2011/0273802 A1 | 11/2011 | Zhou et al. |
| 2011/0279923 A1 * | 11/2011 | Miyauchi et al. ............... 360/75 |
| 2011/0317313 A1 * | 12/2011 | Miyauchi et al. ............... 360/245.3 |
| 2012/0087045 A1 | 4/2012 | Yanagisawa et al. |
| 2012/0087046 A1 | 4/2012 | Yanagisawa et al. |
| 2012/0134057 A1 | 5/2012 | Song et al. |
| 2012/0147504 A1 | 6/2012 | Zhou et al. |
| 2012/0250189 A1 * | 10/2012 | Degawa et al. ............... 360/235.4 |
| 2012/0281320 A1 * | 11/2012 | Singleton et al. ............... 360/319 |

* cited by examiner

METHOD AND SYSTEM FOR PROVIDING A READ TRANSDUCER HAVING AN IMPROVED COMPOSITE MAGNETIC SHIELD

BACKGROUND

FIG. 1 depicts an air-bearing surface (ABS) view of a conventional read transducer 10. The conventional read transducer 10 includes shields 12 and 20, sensor 14 and magnetic bias structures 16. The read sensor 14 is typically a giant magnetoresistive (GMR) sensor or tunneling magnetoresistive (TMR) sensor. The read sensor 14 includes an antiferromagnetic (AFM) layer, a pinned layer, a nonmagnetic spacer layer, and a free layer. Also shown is a capping layer. In addition, seed layer(s) may be used. The free layer has a magnetization sensitive to an external magnetic field. Thus, the free layer functions as a sensor layer for the magnetoresistive sensor 14. The magnetic bias structures 16 may be hard bias structures or soft bias structures 16. These magnetic bias structures are used to magnetically bias the sensor layer of the sensor 14.

Although the conventional transducer 10 functions, there are drawbacks. In particular, the magnetic moment of the shield 20 may be unstable. For example, there may be multiple magnetic domains within the shield 20. Movement of domain walls and other changes to the magnetic moment of the shield 20 may introduce noise or otherwise adversely affect performance of the conventional read transducer 10.

Accordingly, what is needed is a system and method for improving the performance of a magnetic recording read transducer.

BRIEF SUMMARY OF THE INVENTION

A method and system provide a magnetic transducer including first shield, a read sensor, and a second shield. The read sensor is between the first shield and the second shield. The second shield includes a first ferromagnetic layer, a nonmagnetic spacer layer, a second ferromagnetic layer and a pinning layer. The nonmagnetic spacer layer is between the first ferromagnetic layer and the second ferromagnetic layer. The first ferromagnetic layer is between the read sensor and the nonmagnetic spacer layer. The pinning layer is adjacent to the second ferromagnetic layer. The first ferromagnetic layer is coupled antiparallel with the second ferromagnetic layer. At least one of the first ferromagnetic layer and the second ferromagnetic layer includes a CoFe portion adjacent to the nonmagnetic spacer layer. The CoFe portion includes at least twenty-five atomic percent and not more than fifty atomic percent Fe.

DETAILED DESCRIPTION OF THE PREFERRED EMBODIMENTS

Figure 1:
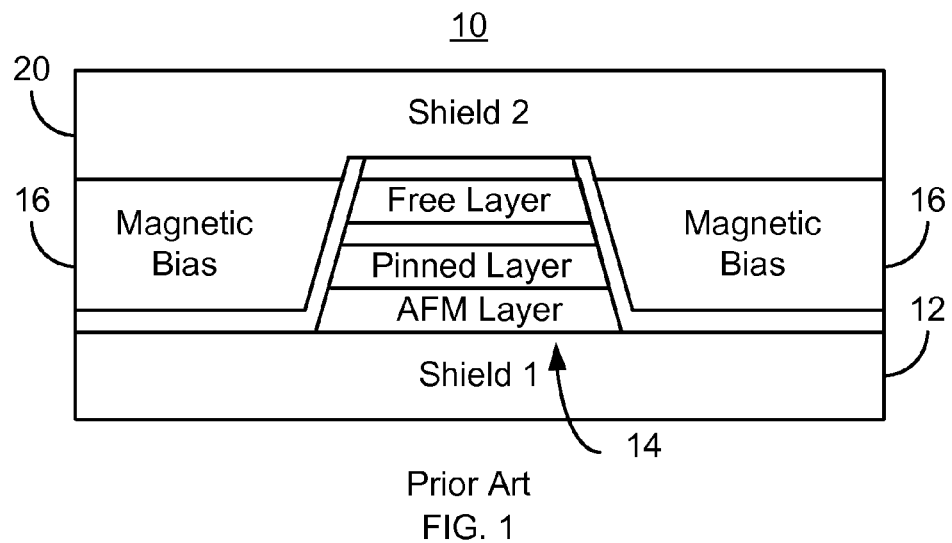
FIG. 1 depicts a conventional read transducer.
Figure 2:
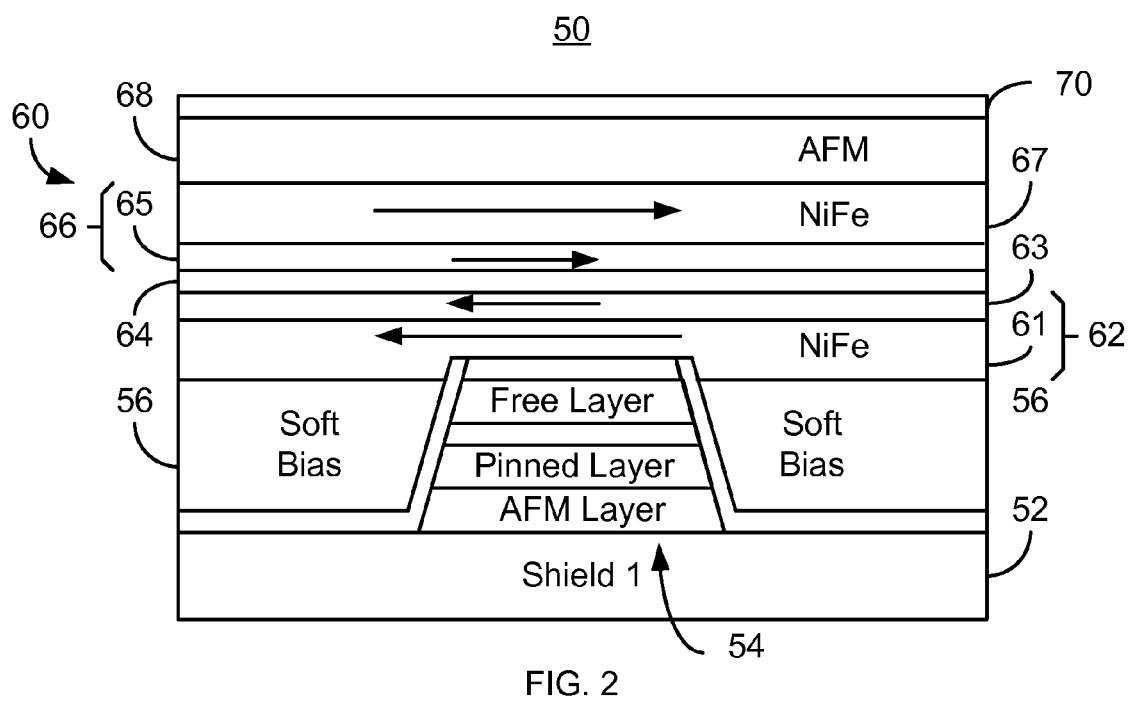
FIG. 2 depicts an ABS view of a more recent magnetic recording read transducer.

FIG. 2 depicts an ABS view of a portion of a more recent magnetic read transducer 50. For clarity, FIG. 2 is not to scale. The read transducer 50 may be part of a read head or may be part of a merged head that also includes a write transducer. The transducer 50 includes shields 52 and 60, a read sensor 54 and soft magnetic bias structures 56. The sensor 54 shown is a GMR or TMR sensor. Thus, the sensor 54 includes a pinning layer, a pinned, a nonmagnetic spacer layer, a free layer, and a capping layer. For simplicity, these layers are not separately labeled in FIG. 2. The sensor 54 may also include seed layer(s) (not shown). Although an AFM layer used to pin the magnetic moment of the pinned layer is shown, in other embodiments, the pinning layer may be omitted or may use a different pinning mechanism. The pinned layer and free layer are each shown as a single layer, but may include multiple layers including but not limited to a synthetic antiferromagnetic (SAF) structure. The nonmagnetic spacer layer may be a conductive layer, a tunneling barrier layer, or other analogous layer. Although depicted as a GMR or TMR sensor, in other embodiments, other structures and other sensing mechanisms may be used for the sensor.

The magnetic bias structures 56 may be soft bias structures fabricated with soft magnetic material(s). The soft magnetic bias structures 56 have a high permeability and a coercivity of less than ten Oe. In some such embodiments, the soft magnetic bias structures 56 have a coercivity of not more than five Oe. For example, the soft magnetic bias structures 56 may include NiFe, such as Permalloy. Because the soft magnetic bias structures 56 have a magnetic moment, the soft magnetic bias structures 56 magnetically bias the free layer.

The magnetic read transducer 50 also includes an antiferromagnetically biased second shield 60. The shield 60 includes ferromagnetic layers 62 and 66, nonmagnetic spacer layer 64, and pinning layer 68. The shield 60 may also include a capping layer 70. The ferromagnetic layers 62 and 66 are separated by nonmagnetic spacer layer 64. The nonmagnetic spacer layer 64 may be Ru, which allows the magnetic moments of the layers 62 and 66 to be coupled antiparallel. The ferromagnetic layers 62 and 66 is each a bilayer. The ferromagnetic layer 62 includes NiFe layer 61 and $Co_{30}Fe_{70}$ layer 63. The ferromagnetic layer 66 includes $Co_{30}Fe_{70}$ layer 65 and NiFe layer 67. The NiFe is a soft magnetic material. The moment of the NiFe layer 67 is pinned by the pinning layer 68. The pinning layer is typically an antiferromagnet (AFM), such as IrMn.

Because the more recently developed magnetic transducer 50 has an antiferromagnetically coupled second shield 60, the performance of the magnetic transducer 50 may be improved. More specifically, the domains in the second shield 60 may be stabilized and noise reduced. Further, use of the $Co_{30}Fe_{70}$ layers 63 and 65 enhance the coupling between the layers 62 and 66. However, the antiferromagnetic coupling between the layers 62 and 66 is believed to be an RKKY coupling. The value of the RKKY coupling between the layers 62 and 66 oscillates between an antiparallel coupling and parallel coupling based on the thickness of the nonmagnetic layer 64 between the ferromagnetic layers 62 and 66. This coupling can change dramatically with the thickness of the nonmagnetic layer 64. Variations in the surface roughness of the layers 62, 64 and 66 as well as other differences due to processing or other conditions may cause deviations in the thickness of the layer 64. The coupling between the layers 62 and 66 may be decreased. Stability of the shield 60 may thus be diminished. Performance of the more recently developed magnetic transducer may thus be adversely affected.

Figure 3:
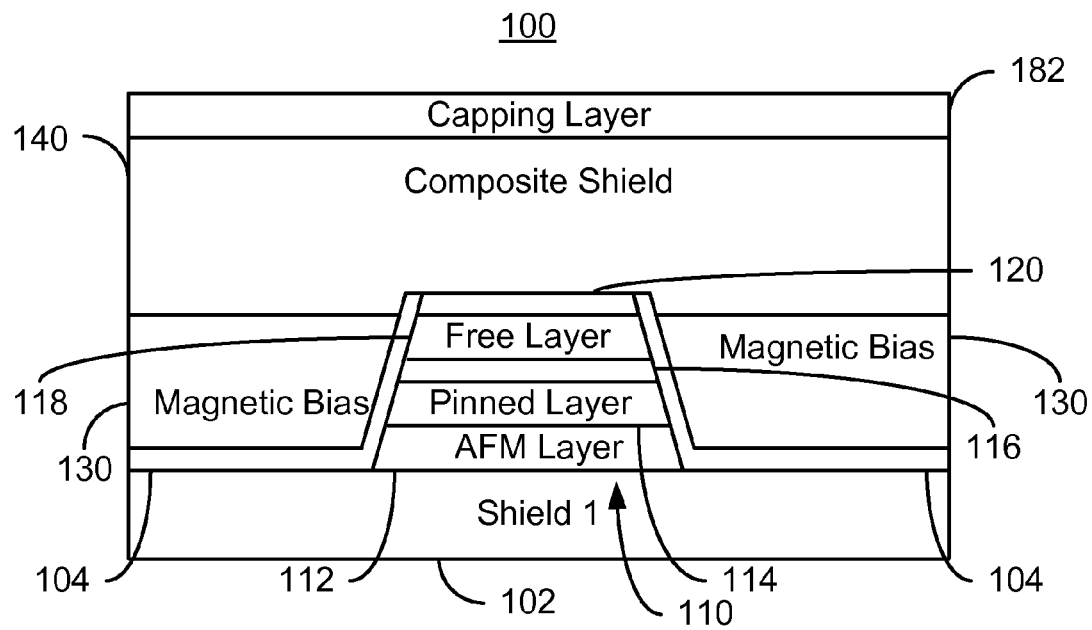
FIG. 3 is an ABS view of an exemplary embodiment of a portion of a magnetic recording read transducer.

FIG. 3 is an ABS view of an exemplary embodiment of a portion of a magnetic recording read transducer 100. For clarity, FIG. 3 is not to scale. The read transducer 100 may be part of a read head or may be part of a merged head that also includes a write transducer. The head of which the read transducer 100 is part of a disk drive having a media, a slider and the head coupled with the slider. The read transducer 100 is also described in the context of particular components. In other embodiments, some of the components may be omitted, provided in a different location, or have different constituents. Further, other components may be used.

The transducer 100 includes a first shield 102, an electric insulator 104, a read sensor 110, magnetic bias structures 130 and a composite shield 140 that may have a capping layer 182. The sensor 110 shown may be a GMR or TMR sensor. Thus, the sensor 110 includes a pinning layer 112, a pinned layer 114, a nonmagnetic spacer layer 116, a free layer 118, and a capping layer 120. The sensor 110 may also include seed layer(s) (not shown). Although an AFM layer 112 used to pin the magnetic moment of the pinned layer 116 is shown, in other embodiments, the pinning layer may be omitted or may use a different pinning mechanism. The pinned layer 114 and free layer 118 are each shown as a single layer, but may include multiple layers including but not limited to a synthetic antiferromagnetic (SAF) structure. The nonmagnetic spacer layer 116 may be a conductive layer, a tunneling barrier layer, or other analogous layer. Although depicted as a GMR or TMR sensor, in other embodiments, other structures and other sensing mechanisms may be used for the sensor 110. The capping layer 182 may include Ru and/or Ta.

The magnetic bias structures 130 may be hard or soft magnetic bias structures. In some embodiments, therefore, the magnetic bias structures are made using soft magnetic material(s). In some embodiments, the soft magnetic bias structures 130 have a high permeability and a coercivity of less than ten Oe. In some such embodiments, the soft magnetic bias structures 130 have a coercivity of not more than five Oe. For example, the soft magnetic bias structures 130 may include NiFe, such as Permalloy. Because the soft magnetic bias structures 130 have a magnetic moment, the soft magnetic bias structures 130 magnetically bias the free layer 118. The soft magnetic bias structures 130 are separated from the sensor 110 by insulating layer 104. Thus, the soft magnetic bias structures 130 are adjacent to the edges of the sensor 110. In the embodiment shown in FIG. 3, the soft magnetic bias structures 130 are also shown as separated from the shield 102 by nonmagnetic layers 104. Thus, the soft magnetic bias structures 130 are magnetically decoupled from the shield 102. However, in alternate embodiments, one or both of the soft magnetic bias structures 130 may be magnetically connected the shield 102.

Figure 4:
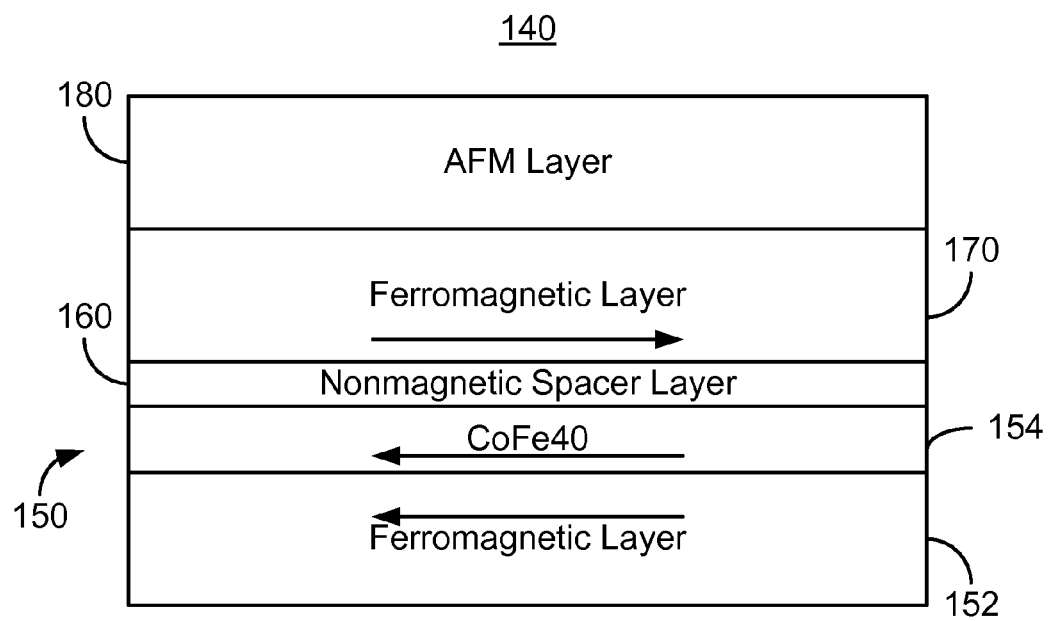
FIG. 4 depicts an ABS view of an exemplary embodiment of a portion of a shield in a magnetic recording read transducer.

The magnetic transducer includes a composite shield 140. FIG. 4 is an exemplary embodiment of a portion of the shield 140. For clarity, FIG. 4 is not to scale. Referring to FIGS. 3-4, the shield 140 is a composite shield. Thus, the shield 140 includes multiple layers and/or materials rather than being a single monolithic layer. In the embodiment depicted in FIG. 4, the shield 140 includes two ferromagnetic layers 150 and 170 separated by a nonmagnetic spacer layer 160. The ferromagnetic layers 150 and 170 may be magnetically soft. The ferromagnetic layers 150 and 170 are also coupled antiparallel through the nonmagnetic spacer layer 160, for example via an RKKY coupling. In some embodiments, therefore, the nonmagnetic spacer layer 160 may be Ru. The shield 140 may also include a pinning layer 180, such as an AFM layer, that pins the magnetic moment of the ferromagnetic layer 170. In some embodiments, the pinning layer 180 includes at least sixty and not more than three hundred Angstroms of IrMn. Thus, one ferromagnetic layer 150 may be adjacent to the magnetic bias structures 130, while the other ferromagnetic layer 170 is adjacent to the pinning layer 180. In the embodiment shown, the ferromagnetic layer 170 is a soft magnetic layer.

The bottom ferromagnetic layer 150 includes two ferromagnetic layers 152 and 154 that are ferromagnetically coupled. In other embodiments, the ferromagnetic layer 150 may include another number of layers. Further, although depicted and described as separate layers, layers 152 and 154 may just be two portions 152 and 154 of the layer 150. For example, there may be no clear interface between the layers 152 and 154, simply change(s) in concentrations and/or types of constituents. The ferromagnetic layer 152 is a soft magnetic layer. For example, the ferromagnetic layer 152 may be a NiFe layer 152. The ferromagnetic layer 152 is also generally significantly thicker than the layer 154. In some embodiments, for example, the ferromagnetic layer 152 may be at least two hundred Angstroms thick, while the layer 154 is not more than thirty Angstroms thick. In other embodiments, the thicknesses of the layers 152 and 154 may vary.

The other ferromagnetic layer 154 is a CoFe layer. The CoFe layer 154 includes at least twenty-five atomic percent and not more than fifty atomic percent Fe. In other words, the layer 154 is $Co_{1-x}Fe_x$, where x is at least 0.25 and not more than 0.5. In some embodiments, the CoFe layer 154 includes at least thirty-five percent and not more than forty atomic percent Fe. The layer 154 may also be thin. For example, the layer 154 may be not more than twenty Angstroms thick. In some embodiments, the layer 154 is not more than ten Angstroms thick.

The ferromagnetic layer 170 may be a NiFe layer. In other embodiments, however, the ferromagnetic layer 170 is a $Co_{1-x}Fe_x$ layer, where x is at least 0.25 and not more than 0.5. In some embodiments, the ferromagnetic layer includes at least thirty-five percent and not more than forty atomic percent Fe.

Because of the presence of the CoFe layer 154 having not more than fifty atomic percent Fe, the coupling between the layers 150 and 170 may be enhanced. The saturation field, $H_{sat}$, may also be increased. In addition, peaks in the oscillations in the RKKY interaction between the layers 150 and 170 may be broadened. Thus, the antiferromagnetic coupling between the layers 150 and 170 may be less sensitive to the thickness of the layer 160. The margin for processing of the shield 140 may thus be increased. Performance of the shield 140 and, therefore, the magnetic recording transducer 100 may be enhanced.

Figure 5:
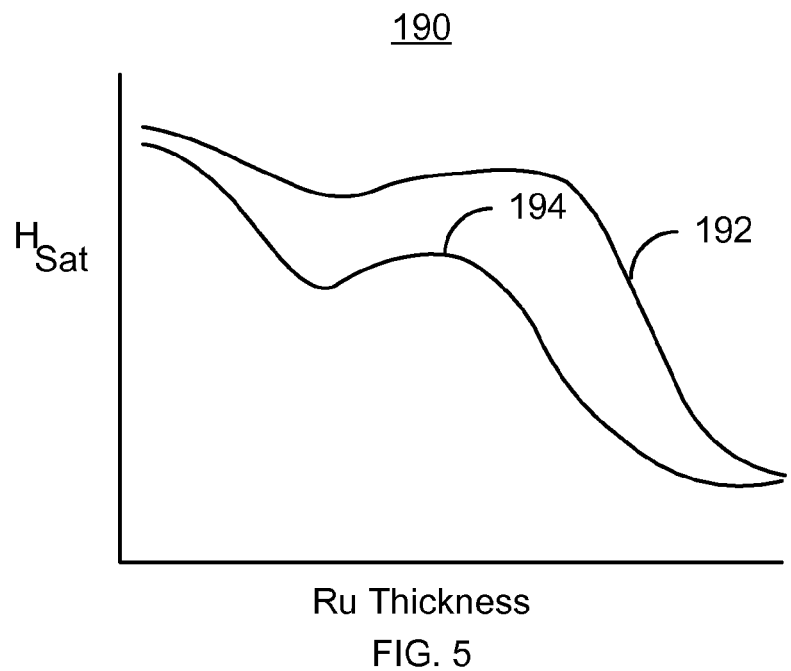
FIG. 5 is a graph depicting the magnetic coupling of layers in a magnetic recording read transducer.

These benefits may be explained in connection with FIG. 5. FIG. 5 is a graph 190 depicting the magnetic coupling of layers in a magnetic recording read transducer. The graph 190 includes two curves 192 and 194. The curves 192 and 194 are for explanatory purposes only and are not intended to depict real-world data or simulations. The curve 192 may be considered to be for the shield 140. In contrast, the curve 194 may be considered to correspond to the recently developed shield 50. As can be seen in FIG. 5, the peaks in the curve 192 are broader and flatter. Thus, the thickness of the spacer 160 may be more widely varied without adversely affecting performance. In some embodiments, for example, the thickness of the spacer layer 160 may be at least four and not more than ten Angstroms while still achieving the desired magnetic coupling between the layers 150 and 170. In some such embodiments, the thickness of the nonmagnetic spacer layer 160 is at least 6.5 Angstroms and not more than 8.5 Angstroms. In contrast, the peaks for the curve 194 are thinner. The tolerance in the thickness of the layer 64 is reduced. Further, the magnitudes of the peaks in the curve 192 are higher than for 194. Consequently, coupling strength may be improved. Performance of the shield 140 and, therefore, magnetic transducer 100 may be improved.

Further, the layer 170 may include CoFe having not more than fifty atomic percent Fe. In some embodiments such a layer may have at least thirty five and not more than forty atomic percent Fe. In such embodiments, the coupling between the ferromagnetic layer 170 and the AFM layer 180 is enhanced. Performance of the shield 140 and the magnetic recording transducer 100 may be further improved.

Figure 6:
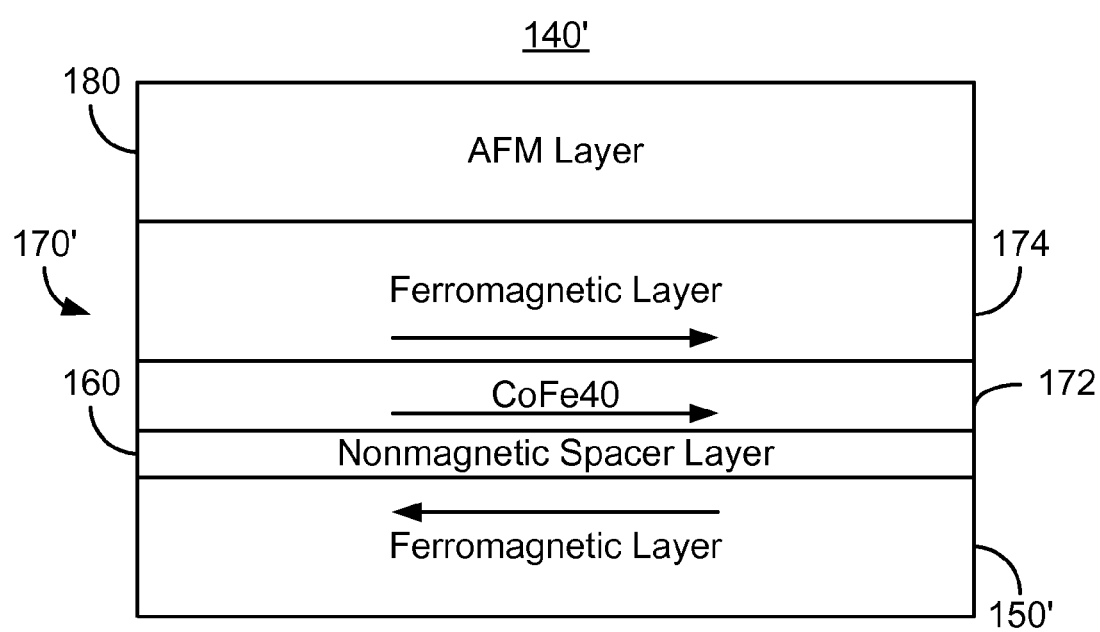
FIG. 6 depicts another ABS view of an exemplary embodiment of a portion of a shield in a magnetic recording read transducer.

FIG. 6 is another exemplary embodiment of a portion of a shield 140'. For clarity, FIG. 6 is not to scale. The shield 140' is analogous to the shield 140. Referring to FIGS. 3 and 6, the shield 140' is a composite shield. The shield 140' includes antiferromagnetic layer 180, ferromagnetic layers 150' and 170', and nonmagnetic spacer layer 160 which are analogous to the antiferromagnetic layer 180, ferromagnetic layers 150 and 170 and nonmagnetic spacer layer 160, respectively. The ferromagnetic layers 150' and 170' may be magnetically soft and are antiferromagnetically coupled through the nonmagnetic spacer layer 160', for example via an RKKY coupling.

In the embodiment shown, the bottom ferromagnetic layer 150' is a single layer. The ferromagnetic layer 150' may be soft and may include NiFe. In some embodiments, the other ferromagnetic layer 150' is a CoFe layer. The CoFe layer 150' may include at least twenty-five atomic percent and not more than fifty atomic percent Fe. In some embodiments, the CoFe layer 150' includes at least thirty-five atomic percent and not more than forty atomic percent Fe.

The top ferromagnetic layer 170' includes two ferromagnetic layers 172 and 174 that are ferromagnetically coupled. In other embodiments, the ferromagnetic layer 170' may include another number of layers. Further, although depicted and described as separate layers, layers 172 and 174 may just be two portions of the layer 170'. For example, there may be no clear interface between the layers 172 and 174, simply change(s) in concentrations and/or types of constituents. The ferromagnetic layer 174 is a soft magnetic layer. For example, the ferromagnetic layer 174 may be a NiFe layer. The ferromagnetic layer 174 is also generally significantly thicker than the layer 172. In some embodiments, for example, the ferromagnetic layer 174 may be at least two hundred Angstroms thick, while the layer 172 is not more than thirty Angstroms thick. In other embodiments, the thicknesses of the layers 172 and 174 may vary. In addition, another CoFe layer analogous to the layer 172 may be included between the ferromagnetic layer 174 and the antiferromagnetic layer 180.

The ferromagnetic layer 172 is a CoFe layer. The CoFe layer 172 includes at least twenty-five atomic percent and not more than fifty atomic percent Fe. In other words, the layer 172 is $Co_{1-x}Fe_x$, where x is at least 0.25 and not more than 0.5.

In some embodiments, the CoFe layer 172 includes at least thirty-five percent and not more than forty atomic percent Fe. The layer 172 may also be thin. For example, the layer 172 may be not more than twenty Angstroms thick. In some embodiments, the layer 172 is not more than ten Angstroms thick.

Because of the presence of the CoFe layer 172, the coupling between the layers 150' and 170' may be enhanced. The saturation field, $H_{sat}$, may also be increased. In addition, peaks in the oscillations in the RKKY interaction between the layers 150' and 170' may be broadened. Thus, the antiferromagnetic coupling between the layers 150' and 170' may be less sensitive to the thickness of the layer 160. The margin for processing of the shield 140' may thus be increased. Performance of the shield 140' and, therefore, the magnetic recording transducer 100 may be enhanced. Further, the layer 170' may have the CoFe described herein adjacent to the antiferromagnetic layer 180. In such embodiments, the coupling between the ferromagnetic layer 170' and the AFM layer 180 is enhanced. Performance of the shield 140' and the magnetic recording transducer 100 may be further improved.

Figure 7:
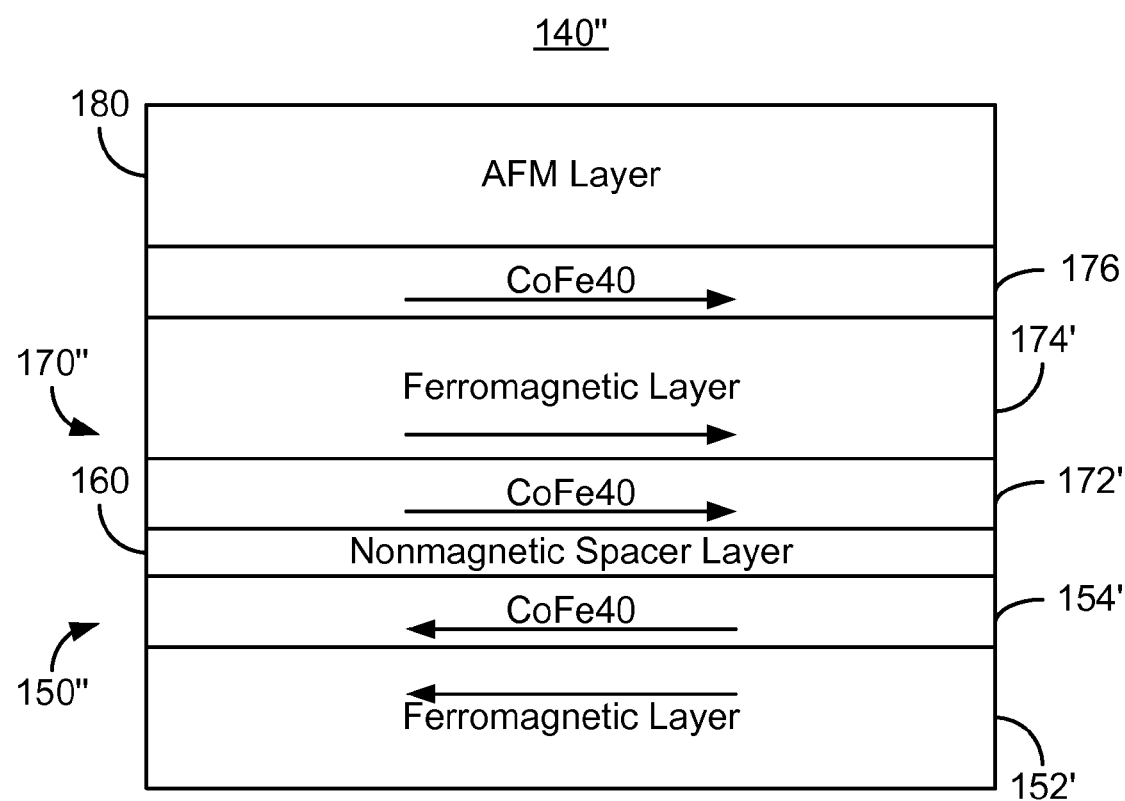
FIG. 7 depicts another ABS view of an exemplary embodiment of a portion of a shield in a magnetic recording read transducer.

FIG. 7 is another exemplary embodiment of a portion of a shield 140". For clarity, FIG. 7 is not to scale. The shield 140" is analogous to the shields 140 and/or 140'. Referring to FIGS. 3 and 7, the shield 140" is a composite shield. The shield 140" includes antiferromagnetic layer 180, ferromagnetic layers 150" and 170", and nonmagnetic spacer layer 160 which are analogous to the antiferromagnetic layer 180, ferromagnetic layers 150/150' and 170/170' and nonmagnetic spacer layer 160, respectively. The ferromagnetic layers 150" and 170" may be magnetically soft and are antiferromagnetically coupled through the nonmagnetic spacer layer 160", for example via an RKKY coupling.

The bottom ferromagnetic layer 150" includes two ferromagnetic layers 152' and 154' that are analogous to the layers 152 and 154. The ferromagnetic layer 152' is a soft magnetic layer and may include NiFe. The ferromagnetic layer 152' is also generally significantly thicker than the layer 154'. In some embodiments, for example, the ferromagnetic layer 152' may be at least two hundred Angstroms thick, while the layer 154' is not more than thirty Angstroms thick. In some such embodiments, the layer 154' may be not more than twenty Angstroms thick. In some embodiments, the layer 154' is not more than ten Angstroms thick. In other embodiments, the thicknesses of the layers 152' and 154' may be different. The ferromagnetic layer 154' is a CoFe layer that includes at least twenty-five atomic percent and not more than fifty atomic percent Fe. In some embodiments, the CoFe layer 154' includes at least thirty-five percent and not more than forty atomic percent Fe.

The top ferromagnetic layer 170" includes ferromagnetic layers 172', 174' and 176 that are ferromagnetically coupled. In other embodiments, the ferromagnetic layer 170" may include another number of layers. The ferromagnetic layer 174' is a soft magnetic layer and may be a NiFe layer. The ferromagnetic layer 174' is also generally significantly thicker than the layer 172' or 174'. In some embodiments, for example, the ferromagnetic layer 174' may be at least two hundred Angstroms thick, while the layers 172' and 176 may each be not more than thirty Angstroms thick. In some embodiments, the layers 172' and 176 may each be not more than twenty Angstroms thick. In some embodiments, the layers 172' and 174 are each not more than ten Angstroms thick. In other embodiments, the thicknesses of the layers 172', 174' and 176 may vary.

The ferromagnetic layers 172' and 176 are each a CoFe layer. The CoFe layers 172' and 176 each includes at least twenty-five atomic percent and not more than fifty atomic percent Fe. In some embodiments, the CoFe layers 172' and 176 each includes at least thirty-five percent and not more than forty atomic percent Fe.

Because of the presence of the CoFe layers 172' and 154', the coupling between the layers 150" and 170" may be enhanced. The saturation field, $H_{sat}$, may also be increased. In addition, peaks in the oscillations in the RKKY interaction between the layers 150" and 170" may be broadened. Thus, the antiferromagnetic coupling between the layers 150" and 170" may be less sensitive to the thickness of the layer 160. The margin for processing of the shield 140" may thus be increased. Performance of the shield 140" and, therefore, the magnetic recording transducer 100 may be enhanced. Further, the layer 170" has the CoFe layer 176 adjacent to the antiferromagnetic layer 180. In such embodiments, the coupling between the ferromagnetic layer 170" and the AFM layer 180 is enhanced. Performance of the shield 140" and the magnetic recording transducer 100 may be further improved.

Figure 8:
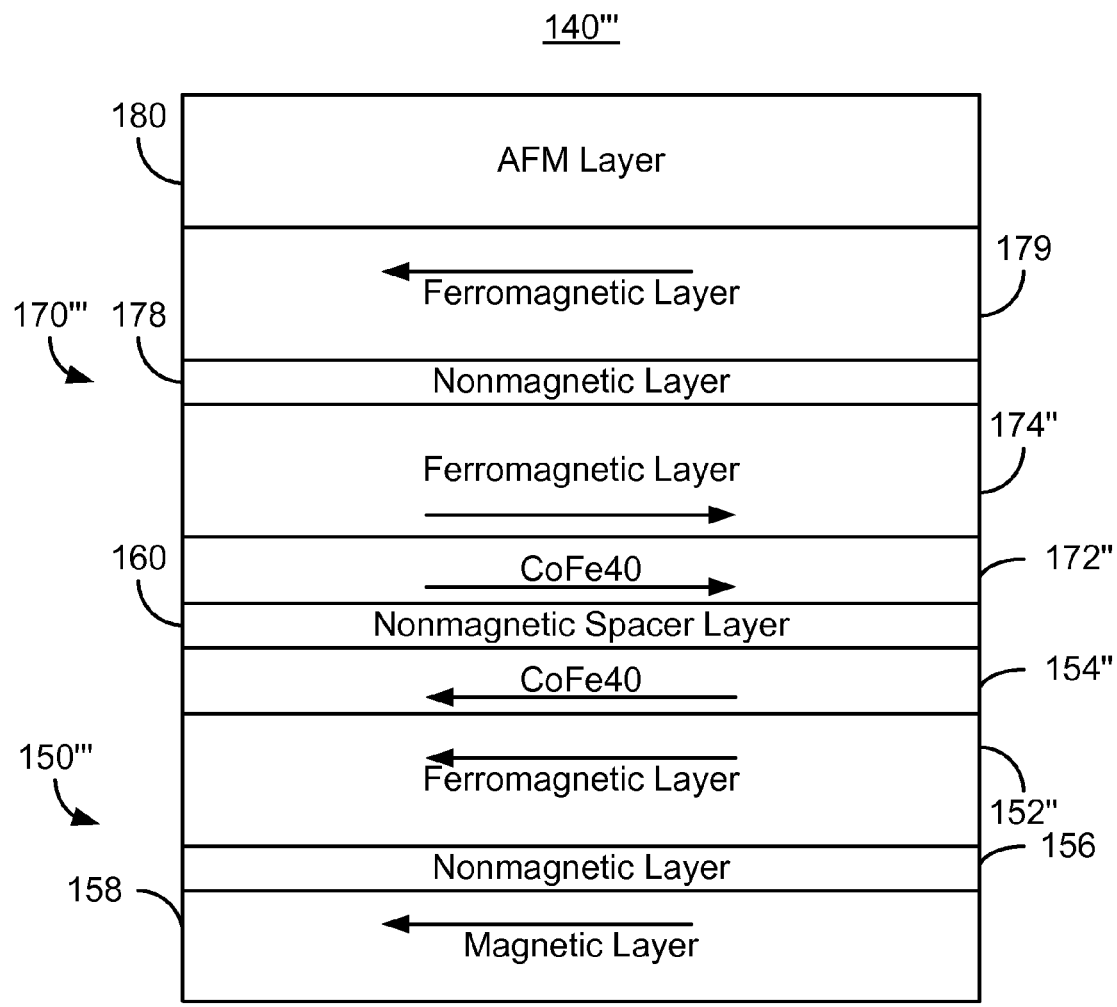
FIG. 8 depicts another ABS view of an exemplary embodiment of a portion of a shield in a magnetic recording read transducer.

FIG. 8 is another exemplary embodiment of a portion of a shield 140'''. For clarity, FIG. 8 is not to scale. The shield 140''' is analogous to the shields 140, 140' and/or 140". Referring to FIGS. 3 and 8, the shield 140''' is a composite shield. The shield 140''' includes antiferromagnetic layer 180, ferromagnetic layers 150''' and 170''', and nonmagnetic spacer layer 160 which are analogous to the antiferromagnetic layer 180, ferromagnetic layers 150/150'/150" and 170/170'/170" and nonmagnetic spacer layer 160, respectively. The ferromagnetic layers 150''' and 170''' may be magnetically soft and are antiferromagnetically coupled through the nonmagnetic spacer layer 160''', for example via an RKKY coupling.

The layers 152", 154", 172" and 174" are analogous to the layers 152/152', 154/154', 172/172' and 174/174', respectively. In addition, the layers 150''' and 170''' include other layers. In the embodiment shown in FIG. 7, the layers 150''' and 170''' are synthetic antiferromagnetic (SAF) layers. Thus, the layer 150''' includes magnetic layer 158 separated from the layer 152" by a nonmagnetic layer 156. The layer 170''' includes magnetic layer 179 separated from the layer 174" by the nonmagnetic layer 178.

The shield 140''' shares the benefits of the shields 140, 140' and/or 140". In particular use of the CoFe layers 154" and 174" may enhance the coupling between the layers 150''' and 170'''. The saturation field, $H_{sat}$, may also be increased. In addition, peaks in the oscillations in the RKKY interaction between the layers 150''' and 170''' may be broadened. Thus, the antiferromagnetic coupling between the layers 150''' and 170''' may be less sensitive to the thickness of the layer 160. The margin for processing of the shield 140''' may thus be increased. Performance of the shield 140''' and, therefore, the magnetic recording transducer 100 may be enhanced. Further, the layer 170''' may have a CoFe layer (not shown) analogous to the layer 176 adjacent to the antiferromagnetic layer 180. In such embodiments, the coupling between the ferromagnetic layer 170''' and the AFM layer 180 is enhanced. Performance of the shield 140''' and the magnetic recording transducer 100 may be further improved.

Figure 9:
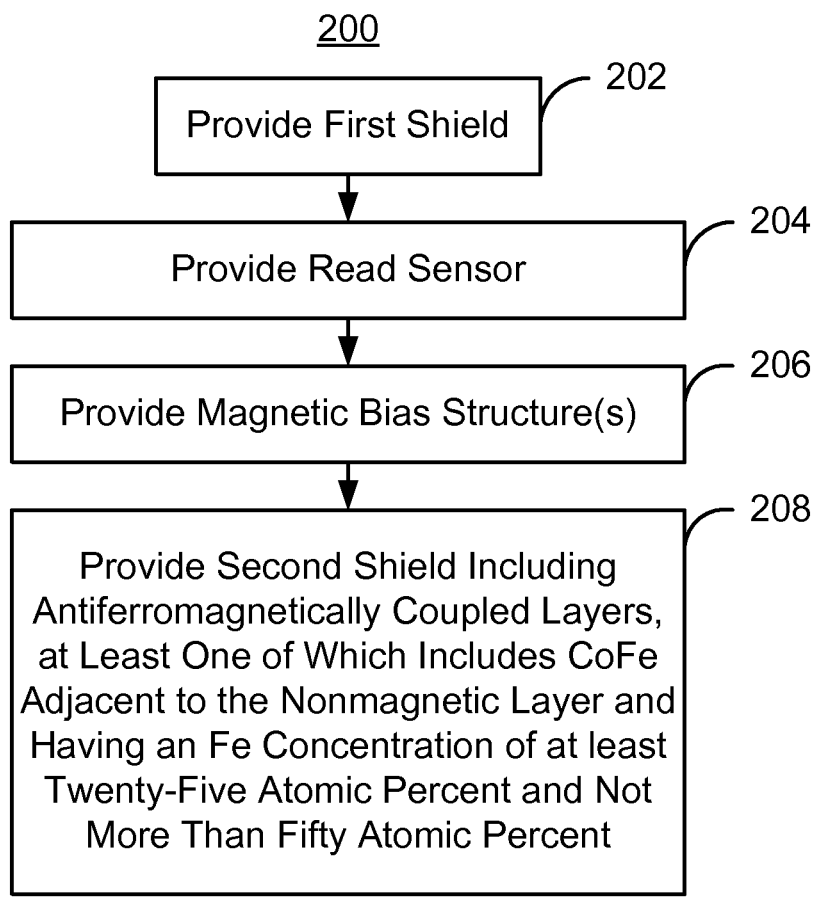
FIG. 9 is flow chart depicting an exemplary embodiment of a method for fabricating a magnetic recording read transducer.

FIG. 9 is an exemplary embodiment of a method 200 for providing a read transducer including a composite shield. For simplicity, some steps may be omitted, interleaved, and/or combined. The method 200 is also described in the context of providing a single recording transducer 100 and shield 140 depicted in FIGS. 3-4. However, the method 200 may be used to fabricate multiple transducers at substantially the same time. The method 200 may also be used to fabricate other shields including but not limited to any combination of 140', 140" and/or 140'''. The method 200 is also described in the context of particular layers. A particular layer may include multiple materials and/or multiple sub-layers. The method 200 also may start after formation of other portions of the magnetic recording transducer.

The first shield 102 is provided, via step 202. Step 202 typically includes depositing a large high permeability layer. The sensor 110 is provided, via step 204. Step 204 typically includes depositing the layers for the sensor 110, then defining the sensor 110 in at least the track width direction using an ion mill. In some embodiments, the free layer 118 and pinned layer 114 of the sensor 110 are also defined in the stripe height direction.

The magnetic bias structures 130 are provided, via step 206. The magnetic bias structures 130 may be soft magnetic bias structures. Step 206 may thus include depositing the high permeability and any other material(s) for the magnetic bias structures 130 and defining the magnetic bias structures 130 in the track width and stripe height direction. In some embodiments, portions of steps 204 and 206 are interleaved. For example, portions of the sensor 110 may be defined in the stripe height direction as the soft magnetic bias structures are defined in the stripe height direction. Step 206 may also include depositing multiple layers for the soft magnetic bias structures 130. Further, in some embodiments, the soft magnetic bias structures 130 are provided such that they may be magnetically coupled to the shield 102 and/or 140.

The shield 140 is provided in steps 208. In some embodiments, the substeps of step 208 are performed as a single processing block in a single deposition system. Thus, the ferromagnetic layers 150 and 170 and nonmagnetic spacer layer 160 are provided, via step 208. Step 208 may also be used to provide the shield 140', 140", 140''' and/or some combination thereof. Thus, the ferromagnetic layers that are CoFe layer(s) including at least twenty-five atomic percent and not more than fifty atomic percent Fe are provided. In some embodiments, the CoFe layer(s) each includes at least thirty-five percent and not more than forty atomic percent Fe. Thus, the benefits of the magnetic transducer 100 and shield 140, 140', 140" and/or 140''' may be achieved.

I claim:

1. A magnetic transducer having an air-bearing surface (ABS) and comprising:
    a first shield;
    a read sensor; and
    a second shield, the read sensor residing between the first shield and the second shield, the second shield including a first ferromagnetic layer, a nonmagnetic spacer layer, a second ferromagnetic layer and a pinning layer, the nonmagnetic spacer layer residing between the first ferromagnetic layer and the second ferromagnetic layer, the first ferromagnetic layer residing between the read sensor and the nonmagnetic spacer layer, the pinning layer being adjacent to the second ferromagnetic layer, the first ferromagnetic layer being coupled antiparallel with the second ferromagnetic layer, at least one of the first ferromagnetic layer and the second ferromagnetic layer including a CoFe portion adjacent to the nonmagnetic spacer layer, the CoFe portion including at least twenty-five atomic percent and not more than fifty atomic percent Fe;
    wherein at least one of the first ferromagnetic layer and the second ferromagnetic layer includes a CoFe layer corresponding to the CoFe portion and a NiFe layer, the CoFe layer residing between the NiFe layer and the nonmagnetic spacer layer.

2. The magnetic transducer of claim 1 wherein the read sensor includes at least one edge, the magnetic transducer further comprising:
   at least one magnetic bias structure adjacent to the at least one edge and residing between the first shield and the second shield.

3. The magnetic read transducer of claim 1 wherein the first magnetic layer includes the CoFe portion.

4. The magnetic read transducer of claim 1 wherein the second magnetic layer includes the CoFe portion.

5. The magnetic read transducer of claim 1 wherein an other of the at least one of the first magnetic layer and the second magnetic layer includes an additional CoFe layer.

6. The magnetic read transducer of claim 1 wherein the first ferromagnetic layer includes the NiFe layer and the CoFe layer and wherein the second magnetic layer includes an additional CoFe layer.

7. The magnetic read transducer of claim 1 wherein the second ferromagnetic layer includes the NiFe layer and the CoFe layer and wherein the first magnetic layer includes an additional CoFe layer.

8. The magnetic read transducer of claim 1 wherein the nonmagnetic spacer layer is Ru.

9. The magnetic transducer of claim 8 wherein the nonmagnetic spacer layer has a thickness of at least four Angstroms and not more than ten Angstroms.

10. The magnetic transducer of claim 1 further comprising:
   a CoFe layer between the second ferromagnetic layer and the pinning layer.

11. A magnetic transducer having an air-bearing surface (ABS) and comprising:
   a first shield;
   a read sensor; and
   a second shield, the read sensor residing between the first shield and the second shield, the second shield including a first ferromagnetic layer, a nonmagnetic spacer layer, a second ferromagnetic layer and a pinning layer, the nonmagnetic spacer layer residing between the first ferromagnetic layer and the second ferromagnetic layer, the first ferromagnetic layer residing between the read sensor and the nonmagnetic spacer layer, the pinning layer being adjacent to the second ferromagnetic layer, the first ferromagnetic layer being coupled antiparallel with the second ferromagnetic layer, at least one of the first ferromagnetic layer and the second ferromagnetic layer including a CoFe portion adjacent to the nonmagnetic spacer layer;
   wherein the CoFe portion includes at least thirty-five percent and not more than forty atomic percent Fe.

12. A disk drive comprising:
   a media;
   a slider including a magnetic read transducer having an air-bearing surface (ABS), the magnetic read transducer including a first shield, a read sensor and a second shield, the read sensor residing between the first shield and the second shield, the second shield including a first ferromagnetic layer, a nonmagnetic spacer layer, a second ferromagnetic layer and a pinning layer, the nonmagnetic spacer layer residing between the first ferromagnetic layer and the second ferromagnetic layer, the first ferromagnetic layer residing between the read sensor and the nonmagnetic spacer layer, the pinning layer being adjacent to the second ferromagnetic layer, the first ferromagnetic layer being coupled antiparallel with the second ferromagnetic layer, at least one of the first ferromagnetic layer and the second ferromagnetic layer including a CoFe portion adjacent to the nonmagnetic spacer layer, the CoFe portion including at least twenty-five atomic percent and not more than fifty atomic percent Fe;
   wherein at least one of the first ferromagnetic layer and the second ferromagnetic layer includes a CoFe layer corresponding to the CoFe portion and a NiFe layer, the CoFe layer residing between the NiFe layer and the nonmagnetic spacer layer.

13. The disk drive of claim 12 wherein the CoFe portion includes at least thirty-five percent and not more than forty atomic percent Fe.

14. A method for providing a magnetic read transducer having an air-bearing surface (ABS) comprising:
   providing a first shield;
   providing a read sensor; and
   providing a second shield, the read sensor residing between the first shield and the second shield, the second shield including a first ferromagnetic layer, a nonmagnetic spacer layer, a second ferromagnetic layer and a pinning layer, the nonmagnetic spacer layer residing between the first ferromagnetic layer and the second ferromagnetic layer, the first ferromagnetic layer residing between the read sensor and the nonmagnetic spacer layer, the pinning layer being adjacent to the second ferromagnetic layer, the first ferromagnetic layer being coupled antiparallel with the second ferromagnetic layer, at least one of the first ferromagnetic layer and the second ferromagnetic layer including a CoFe portion adjacent to the nonmagnetic spacer layer, the CoFe portion including at least twenty-five atomic percent and not more than fifty atomic percent Fe;
   wherein at least one of the first ferromagnetic layer and the second ferromagnetic layer includes a CoFe layer corresponding to the CoFe portion and a NiFe layer, the CoFe layer residing between the NiFe layer and the nonmagnetic spacer layer.

15. The method of claim 14 wherein the CoFe portion includes at least thirty-five percent and not more than forty atomic percent Fe.

16. The method of claim 14 of wherein the read sensor includes at least one edge, the magnetic transducer further comprising:
   at least one magnetic bias structure adjacent to the at least one edge and residing between the first shield and the second shield.

17. The method of claim 16 wherein the second magnetic layer includes the CoFe portion.

18. The method of claim 14 wherein the first magnetic layer includes the CoFe portion.

19. The method of claim 14 wherein an other of the at least one of the first magnetic layer and the second magnetic layer includes an additional CoFe layer corresponding to the CoFe portion.

20. The method of claim 14 wherein the first ferromagnetic layer includes the NiFe layer and the CoFe layer and wherein the second magnetic layer includes an additional CoFe layer.

21. The method of claim 14 wherein the second ferromagnetic layer includes the NiFe layer and the CoFe layer and wherein the first magnetic layer includes an additional CoFe layer.

22. The method of claim 14 wherein the nonmagnetic spacer layer is Ru.

23. The method of claim 22 wherein the nonmagnetic spacer layer has a thickness of at least four Angstroms and not more than ten Angstroms.

* * * * *